INVENTOR
JOSEPH W. MAGLAUGHLIN.

BY Archworth Martin
his ATTORNEY

Fig. 5.

May 4, 1948.  J. W. MAGLAUGHLIN  2,440,778
EVAPORATING AND DRYING APPARATUS
Filed May 25, 1945   8 Sheets-Sheet 7

Fig. 6.

INVENTOR
JOSEPH W. MAGLAUGHLIN
BY Archworth Martin
his ATTORNEY

May 4, 1948.    J. W. MAGLAUGHLIN    2,440,778
EVAPORATING AND DRYING APPARATUS
Filed May 25, 1945    8 Sheets-Sheet 8

INVENTOR
JOSEPH W. MAGLAUGHLIN.
BY Ashworth Martin
ATTORNEY

Patented May 4, 1948

2,440,778

UNITED STATES PATENT OFFICE 2,440,778

EVAPORATING AND DRYING APPARATUS

Joseph W. Maglaughlin, Pittsburgh, Pa.

Application May 25, 1945, Serial No. 595,747

8 Claims. (Cl. 159—26)

My invention relates to evaporating and drying apparatus and particularly to an apparatus and method of treating mixtures of liquids and solids for the purpose of eliminating all or a desired portion of the liquid and leaving dried or partially dried residue.

The apparatus and method are particularly useful in the evaporation and drying of the liquid content from the "slops" or residues of breweries or distilleries with the purpose of preparing from such residues uniformly consistent products for use as feed for domestic animals, or otherwise conveniently disposing of what is frequently considered a waste material that is a nuisance.

The apparatus can also be employed in the treatment of various other products of a liquid-solid nature, by evaporation, to concentrate or dry the solids, such as in the case of various fruit, fruit juices; to dry the wastes from meats and vegetables, including tomatoes; butters and jellies, etc. that are produced from fruits. It can also be used for evaporating wastes of strong organic content, from manufacturing establishments, in conforming to regulations that prohibit discharge of such waste liquids into natural water courses or sedimentation pools.

One object of my invention is to provide an apparatus and process of the character referred to wherein it is unnecesary to strain or filter the solids from the liquid mixture and wherein waste slops etc., such as those from a brewery or distillery, can be handled directly as they are produced.

Another object of my invention is to provide apparatus which will be economical in the use of the heat required for treatment of the materials; which can continuously be operated over longer periods of time than various other forms of apparatus, without shut-down for cleaning and adjustment; which can readily be controlled at all stages of operating in accordance with changes in materials by treating or the character of finished product desired, and whereby materials of various kinds which require accurate control of temperature, to avoid impairment of the final product, may be treated.

In the accompanying drawings which show a system or apparatus for practicing my invention, Fig. 8 is an end view of the discharge chamber without its cover plate, for one of the evaporator drums of Fig. 1a.

Figure 9:
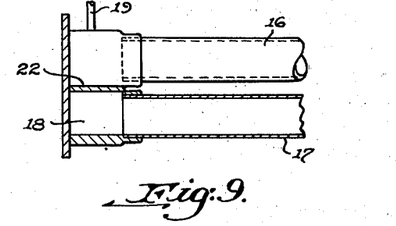
Fig. 9 is an enlarged longitudinal sectional view of the header at one end of an evaporator drum.

Referring first to the evaporator shown in Figs. 1a to 4, an upper group of evaporator drums are numbered 14 and a lower group of similarly formed drums are numbered 15, each group being separately supplied with sludge or liquid mixture to be treated as hereinafter explained. An upper pair of tubes 16 and a lower pair of tubes 17 are provided in each of the drums 14—15. The upper tubes extend through the front end wall of the drum into a head box 18 (Figs. 4 and 9) which receives the mixture to be treated through an inlet pipe 19, such mixture entering the tubes and being conveyed to the opposite ends thereof as hereinafter explained. Similarly the tubes 17 extend into the box 18 and are supplied with the sludge mixture through a pipe 21. A partition plate 22 is provided in the box 18 so that material can be supplied either to the upper pair of tubes or the lower pair of tubes, though usually the material will be supplied simultaneously both through pipes 19 and 21. The drums 14—15 and the contained tubes are preferably sloped or inclined upwardly from their inlet ends to their discharge ends at their transfer chambers 23 (Figs. 3 and 4), that have boiler inspection plugs 23a (Fig. 2) in their ends. By this arrangement, liquid can be maintained in the lower portions of the tubes so that it will not flow into the discharge boxes or chambers at 23 during the evaporating process, only the solids in a somewhat wet condition being discharged.

Figure 3:
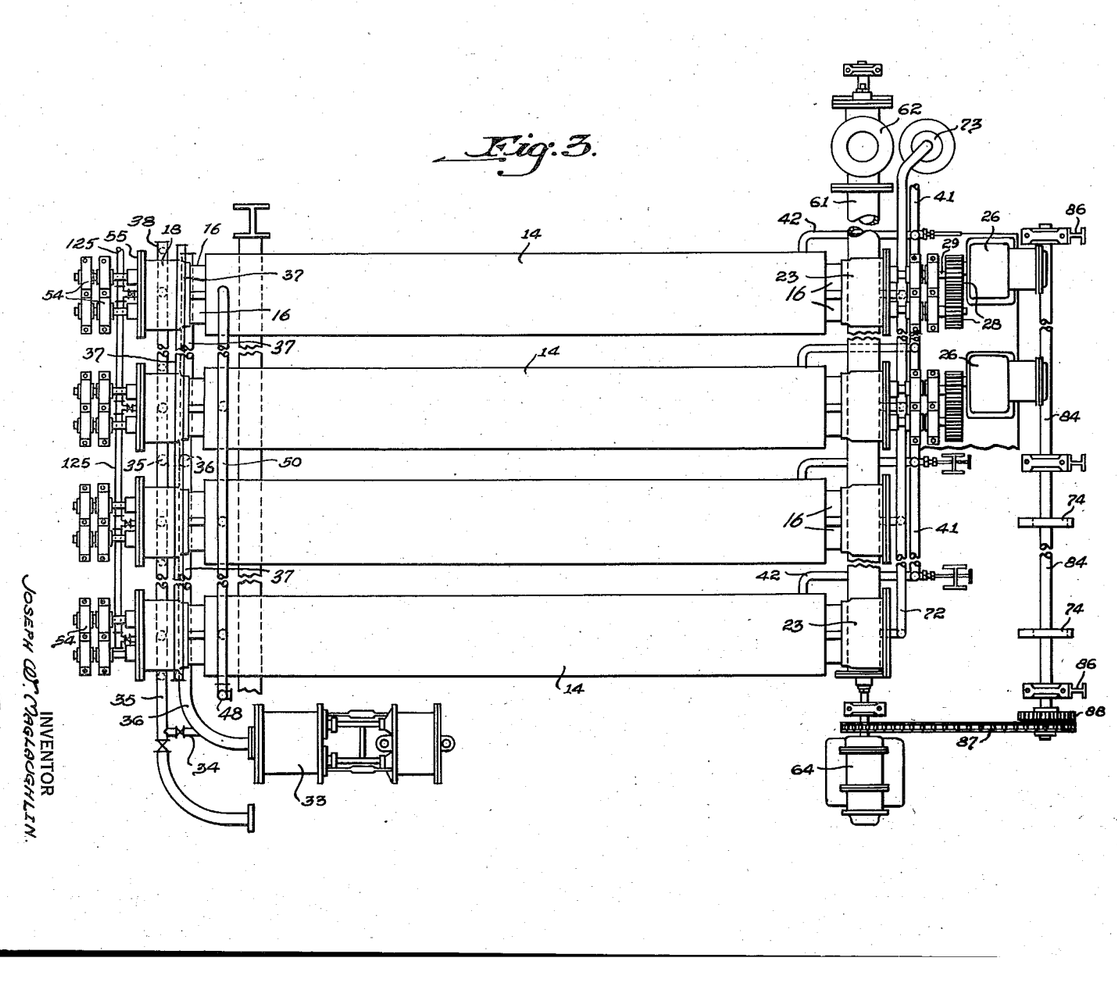
Fig. 3 is a plan view of the evaporator of Fig. 1b.
Figure 4:
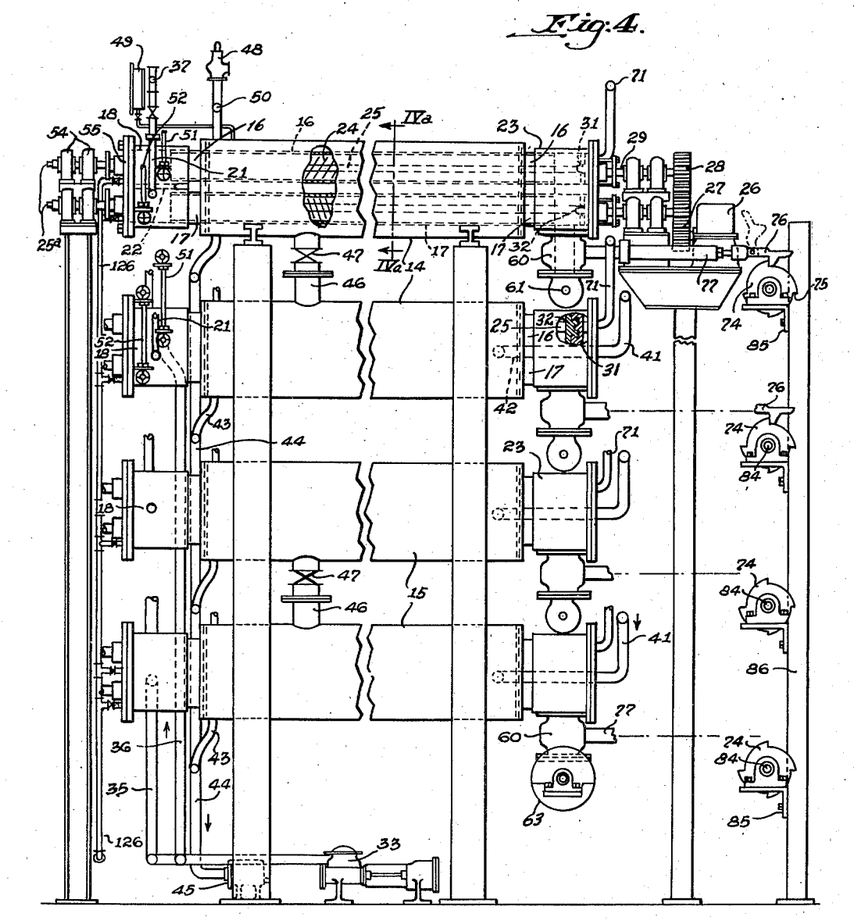
Fig. 4 is a side view of the evaporator partly in section and with parts omitted, for clarity.
Figure 4A:
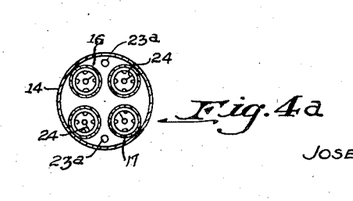
Fig. 4a is a sectional view through one of the drums of Fig. 4.
Figure 4B:
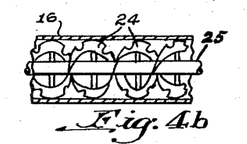
Fig. 4b is an enlarged view of one of the conveyers of Fig. 1.
Figure 5:
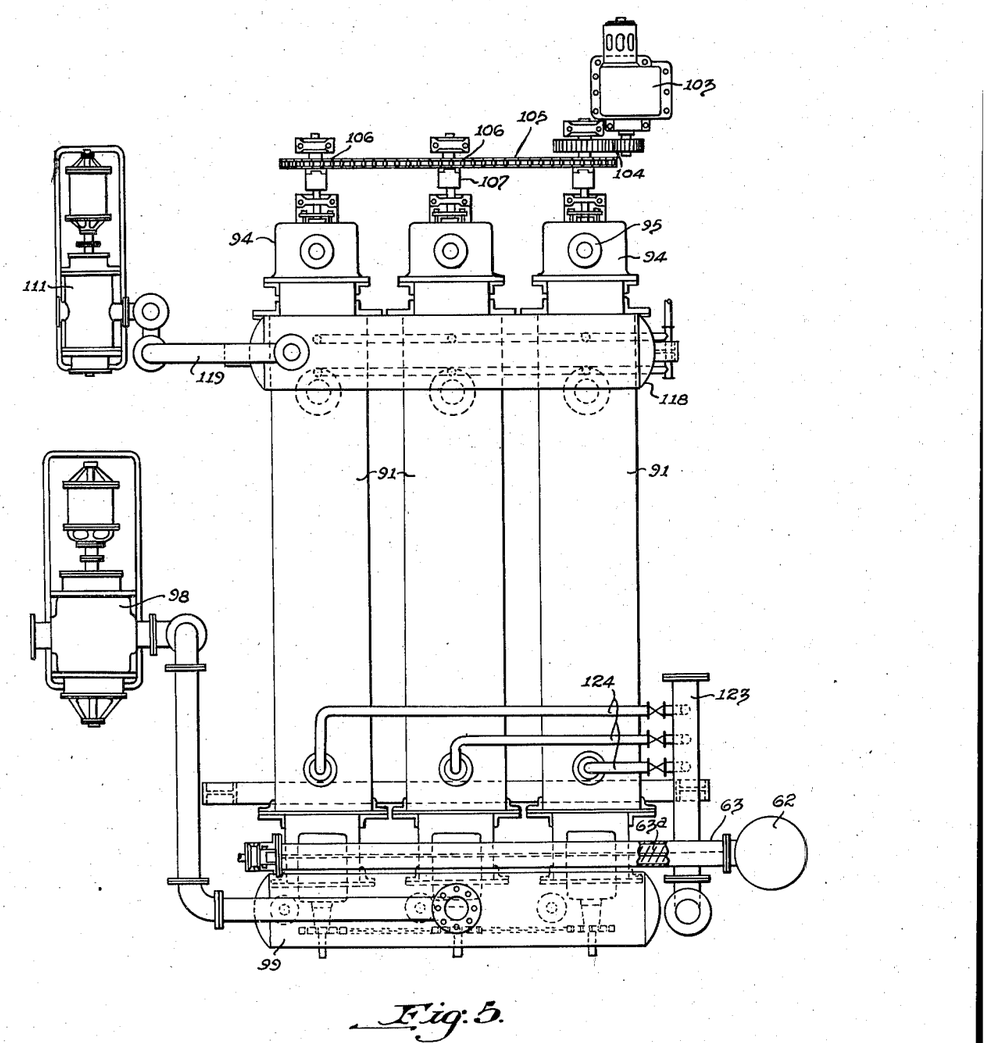
Fig. 5 is a plan view of the drying unit of Fig. 1b.
Figure 6:
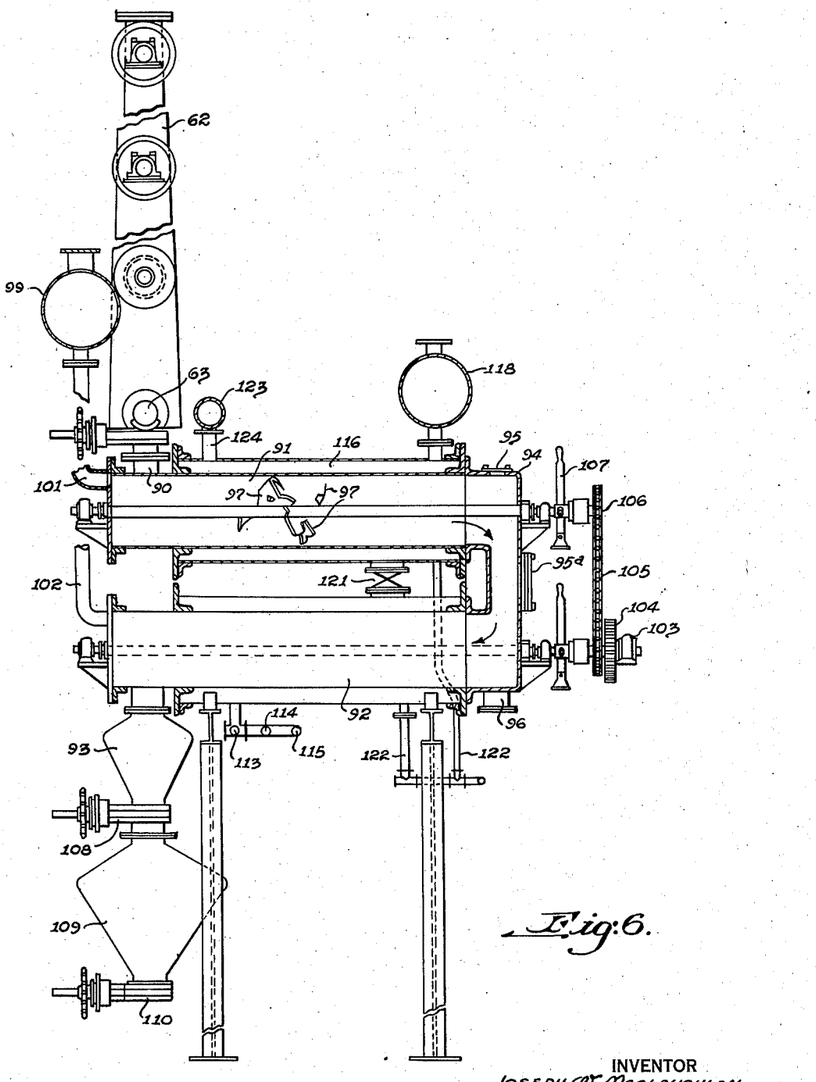
Fig. 6 is a side view thereof partly in section.
Figure 7:
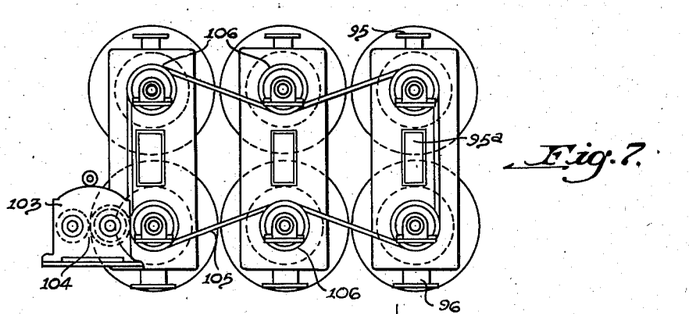
Fig. 7 is an end view thereof.
Figure 8:
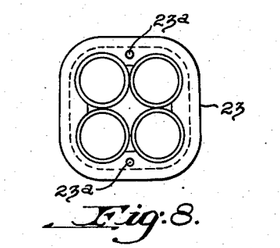
Figure 10:
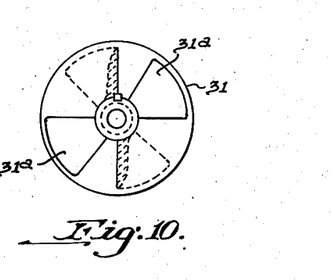
Fig. 10 is an end view, on an enlarged scale, of one of the coupling elements of the driving mechanism for a screw conveyor and agitator of an evaporator drum.
Figure 11:
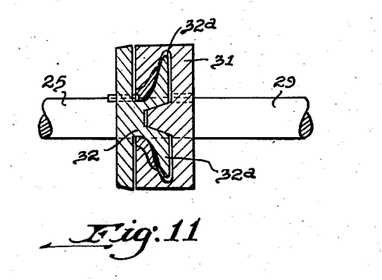
Fig. 11 is a longitudinal sectional view thereof.

A screw type conveyor 24 (Figs. 4 and 4b) with its shaft 25 (Fig. 11) is provided in each tube 16—17, the conveyor shafts being driven by electric motors 26, only some of which are shown on Figs. 3 and 4. Each motor drives four shafts 29, through a pinion 27 and gear wheels 28 that have driving connection with one another. Each shaft 29 carries a coupling member 31 (Figs. 10 and 11) which has detachable connection with a coupling member 32 that is secured to a shaft 25. The member 32 has arms 32a that are inserted into undercut recesses 31a of the member 31, and then turned to connect and disconnect the shafts. The coupling member 32 is of slightly less diameter than the tubes 16 so that when it is turned backwardly for a partial revolution, to disconnect it from the member 31, the shaft 25 and the member 32, together with the conveyor screw, can be withdrawn from the front ends of the tubes 16 and 17 as hereinafter explained.

The sludge to be evaporated and dried is supplied to the header boxes 18 by a pump or pumps 33 through pipes 35 and 36 (Figs. 3 and 4), which can be cross-connected at 34 (Fig. 3) when only one pump 33 is needed. The pipe 35 leads to the lower bank of drums 15 while the pipe 36 leads to the upper bank of drums 14. The two lines 35—36 are provided so that in installations of great height, the static pressure of the liquid in the upper evaporator pipes will not be imposed upon the liquid in the lower pipes. The pipe 36 has branches 37 (Fig. 2) which have pipe connection with the inlets 19 and 21 to the upper and lower chambers respectively of headers 18. The pipe 35 has similar branches 38 that are connected to the header boxes for the lower bank of the tubes.

As the sludge or liquid-solid mixture is pumped into these boxes 18, it will enter the tubes 16 and 17 and be caught by the conveyor screws 24. The screws will advance the solids toward the discharge boxes 23, and to this end have notches or serrations formed in their peripheries (Fig. 4b) so that they will act somewhat as strainers and therefore allow the more liquid portion of the mixture to remain near the lower ends of the tubes and thus avoid carrying it into the boxes 23. The rate at which the mixture is introduced into the header boxes 18, the pressure at which the heating medium is supplied, and consequently the amount of heat supplied into the drums 15 will be controlled by thermostats or in some other suitable manner, so that water will not flow out of the upper ends of the tubes. Usually only a somewhat plastic mass or material of a thickened consistency will be discharged from the tubes into the boxes 23.

Heat is supplied to the drums, and in surrounding relation to the tubes 16 and 17, in the form of any suitable heating fluid such as super-heated steam. Since the mixture in the tubes 16 and 17 is largely liquid, a much higher evaporating temperature (such as 275° F. to 360° F.) can be used than would usually be permissible in a drying operation.

The super-heated steam or other heating medium is supplied from any suitable source, through a pipe or pipes 41 and 42 (Figs. 1a, 3 and 4) into the drums 14 and 15, near the upper or discharge end of the conveyors. In the case where steam is used as the heating medium, it will, of course, become condensed and will flow to the lower ends of the drums from whence the condensate will drain off through pipes 43 and 44 to a steam trap 45 (Fig. 4) or other suitable disposal unit.

Piped connections between the drums may be provided at 46 having valves 47 (Fig. 4). Where all of the materials in the various tubes are to be subjected to the same temperature, these valves may be left open and the heating steam flow from one drum to other drums. Where different temperatures are required in certain drums than in other drums, the valves 47 will be kept closed, and the temperature and pressure in each drum will be regulated in accordance with the heating effect desired therein. It will be understood that if high pressures are employed with vapor of a given character, the heating effect will be greater than with lower pressures. Safety valves 48 (Figs. 2 and 4) and pipe connections 50 (Figs. 3 and 4) are provided for the drums to relieve dangerously high pressures or to relieve pressures that may tend to cause too great heating of the liquid mixture. Pressure gages 49 are also provided to give readings of the pressures in the drums. Where the drums are all interconnected as at 46 and are always operated in that manner, one pressure gage and one relief valve will be sufficient, but in other cases, pressure gages and relief valves will be required for each drum or for each horizontal row of drums.

Gage glasses 51 and 52 are connected to the inlet boxes 18 at the upper and lower sides respectively of the partitions 22, to show the height of the liquid in the tubes 16 and 17 so that the operator can see that a desired amount of liquid is maintained in the tubes and that none of the liquid will flow into the discharge boxes 23.

In order to permit of removal of any of the shafts 25 and their conveyor screws, the shaft bearings at 54 (Figs. 3 and 4) will be removed and the cover plate 55 will be disconnected from the header box 18. Thereupon a wrench will be applied to the square end 25a of a shaft 25 (Fig. 11) and the shaft turned slightly to disengage its coupling element 32 from the coupling element 31. The conveyor, together with the coupling element 32, can be then withdrawn from its tube 16.

Figure 12:
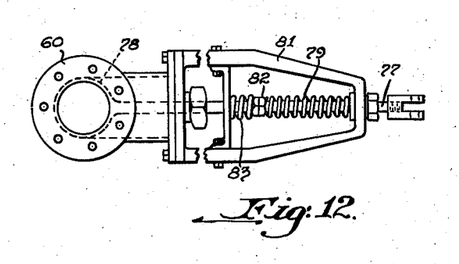
Fig. 12 is an end view of one of the valves for controlling the discharge of material from the evaporator drums on an enlarged scale.

The material from which the major portion of the water has been evaporated will be discharged through the boxes 23 and past valves 60 (Figs. 1a, 4 and 12) and into conveyor conduits 61. Screw conveyors in the conduits 61 carry the material to a conduit or stack 62 which is of somewhat tapered form so that the material will not likely clog therein, and has an inspection opening and cover plate 62a (Fig. 1b) at its lower end. This material and material from the lowermost row of boxes 23 falls into a horizontal conduit 63 through which it is forced by a conveyor screw 63a (Fig. 1a) to the drying apparatus of Figs. 1b, 5, 6 and 7.

Figure 1A:
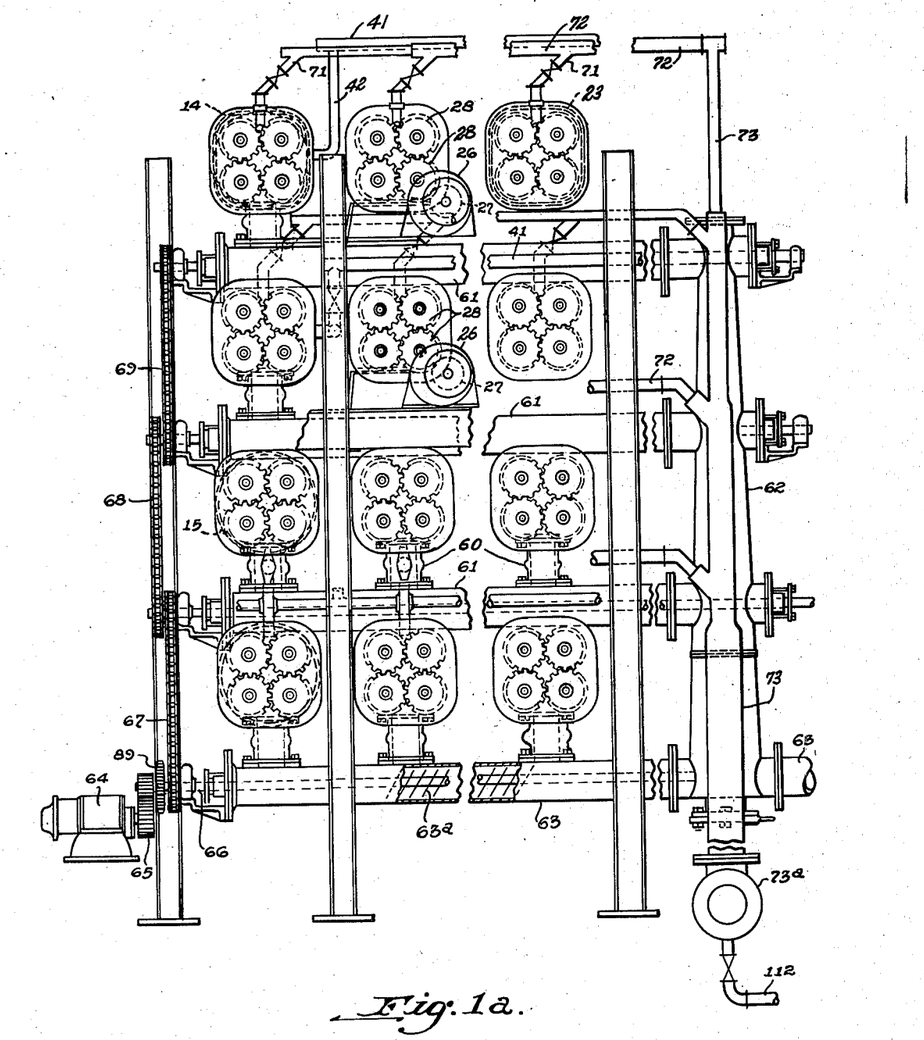
Figures 1a—1b show, partly in section, a rear end elevation of an evaporator and drier, a portion of the structure of Fig. 1a being duplicated on Fig. 1b for clarity of illustration.
Figure 1B:
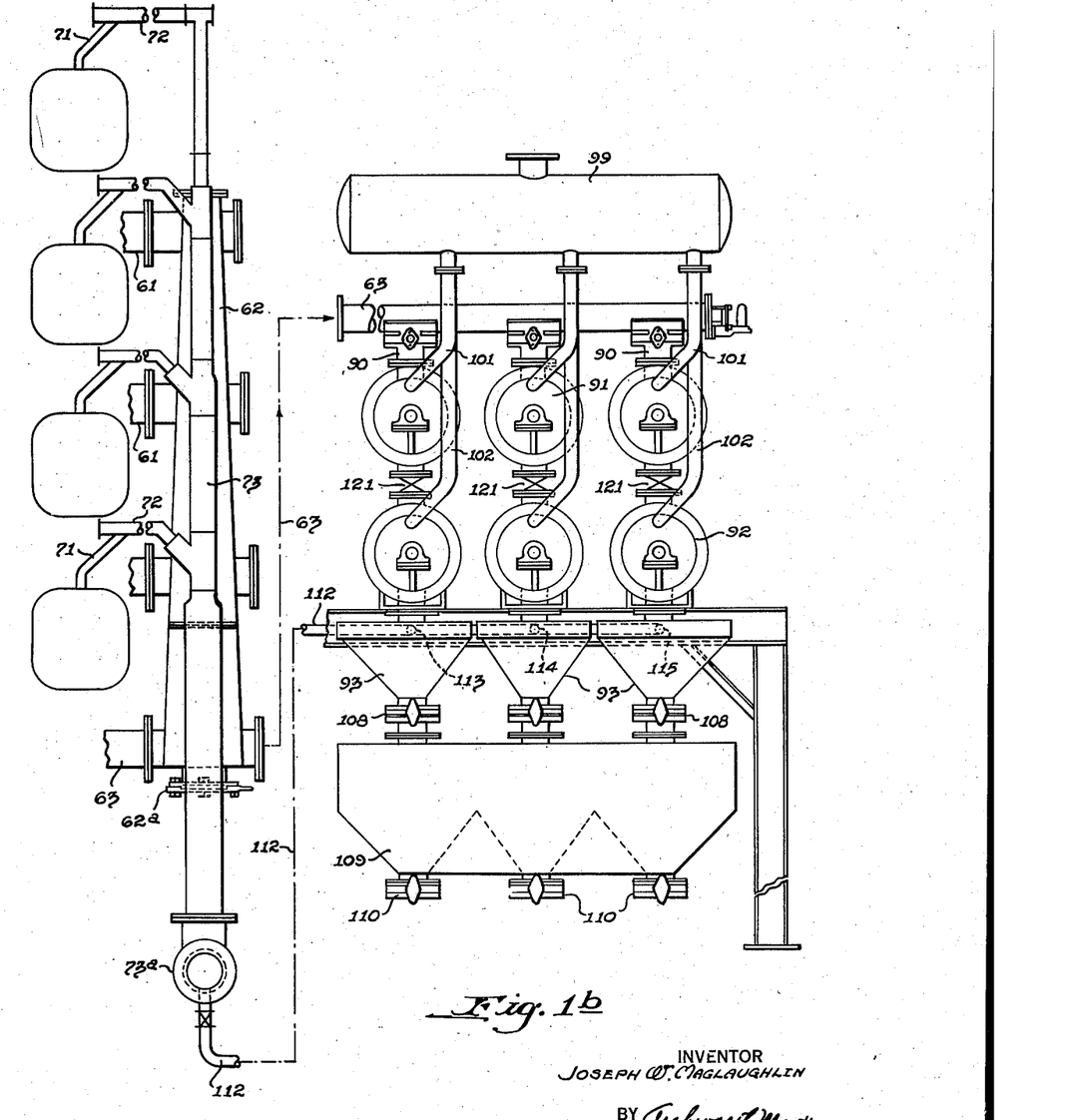
Figure 2:
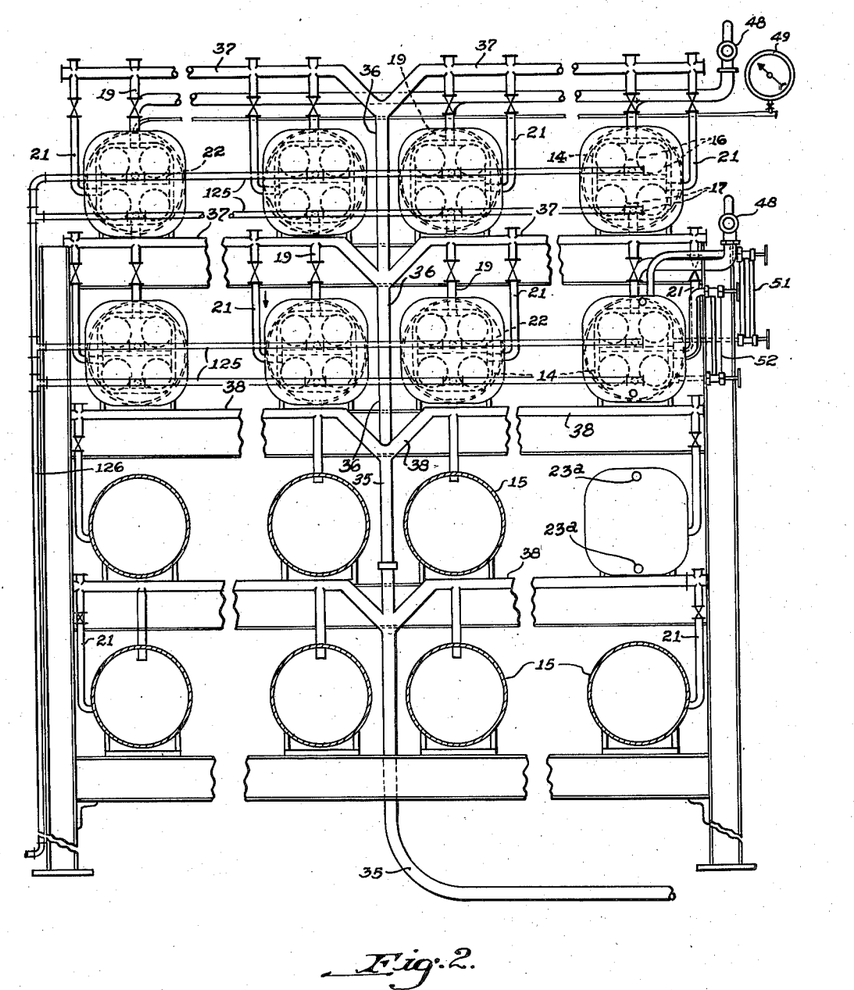
Fig. 2 is a front end elevational view of the evaporator of Fig. 1b, partly in section.

As shown more clearly in Fig. 1a, the conveyors for moving the plastic mass through the conduits 61 and 63 are driven by a motor 64 through a gear reduction unit 65 and the shaft 66 of the conveyor screw 63a. The shaft 66 through a sprocket-chain drive at 67 drives the conveyor screw in the lowermost conduit 61; a sprocket-chain drive at 68 drives the screw in the next conduit 61, and a sprocket-chain drive at 69 drives the next higher conveyor screw.

A lower temperature is usually desired in the drying unit than in the evaporating unit, ranging from about 150° to 250° F. dependent upon the nature of the material being processed, as I find it convenient and economical to use the vapor from the evaporator tubes 16 and 17 as a heating medium for effecting the actual drying of the plastic mass of material. It will, however, be understood that in some cases the material from which the major portion of the water has been evaporated can be utilized or disposed of satisfactorily without the necessity of passing it through a drying unit.

The vapors of evaporation from within the tubes 16–17 will enter the discharge boxes 23 from whence they will be exhausted by a desired degree of suction or vacuum force through pipes 71 (Figs. 1a and 4) that communicate with the interior of these boxes and with pipes 72 that lead to the header line 73.

Figure 13:
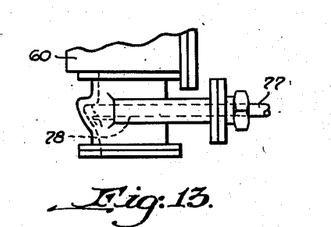
Fig. 13 is a side view thereof.

The valves 60 (Figs. 4, 12, 13) are closed for most of the time so as to permit of substantially continuous suctional or vacuum force in the boxes 23 and in a portion of the tubes 16 and 17, to withdraw the vapor of evaporation. There is one valve for each of the discharge boxes 23 and each valve is periodically opened by a disc 74 having teeth 75 that successively engage a pawl 76 that is connected to the valve stem 77. The gate or disc 78 of the valve (Fig. 12) is normally held closed by a spring 79 that is interposed between a yoke 81 that is carried by the valve body and a nut 82 so that when the disc 74 pulls the valve open to a point at which one of its shoulders 75 moves out of engagement with the pawl 76, the valve will be snapped to closed position. The innermost edge of the valve disc 78 is beveled as shown in Fig. 13 to give some downward impulse to the material and to avoid clogging by the material at the inner edge of the valve disc. A small cushioning spring 83 is provided to prevent excessive impact when the valve is snapped closed by the spring 79.

The valve-operating discs 74 are secured to shafts 84 that are respectively mounted on brackets 85 which are secured to upright frame member 86. Only the first of the valve-operating discs 74 is shown in Fig. 4, but it will be understood that each bracket and bearing 85 carries a shaft 84, with a series of discs on each shaft. The shafts 84 are driven by sprocket chains such as 87, from the shafts that drive the conveyor screws in the conduits 61, as indicated in Fig. 3. If desired only one shaft 84 need be driven from one of the conveyor shafts (as by a sprocket wheel 89, Fig. 1a), and the other shafts 84 driven therefrom by the use of additional sprocket wheels such as 88 (Fig. 3), after the manner in which the screw conveyors of the conduits 61 are driven in Fig. 1a.

Referring now to Figs. 1b, 5, 6, and 7, the mass of wet material is directed from the conduit 63 through passageways 90 into drier drums 91 wherein it is advanced in the direction of the arrows (Fig. 6) by screw type conveyors and agitators in the drums 91 and 92, to hoppers 93, each pair of upper and lower drums being connected by a header chamber 94 that has inspection openings at 95 and 95a, which may be glass covered, and a clean-out opening at 96. The upper and lower conveyor vanes 97 have reverse angularity with respect to one another so as to move the material in a looped path as shown by the arrows in Fig. 6. The vanes are of irregular or broken contour so as to break up and agitate the material to release the moisture.

During movement of the material through the drying drums, a suction pump 98 (Fig. 5) is operated to create a vacuum force within a tank or chamber 99, the chamber 99 being connected to the drums 91 and 92 through pipes 101 and 102 (Fig. 1b) respectively. The removal of vapor from the material in the drier is thereby facilitated.

The shafts for the conveyor vanes 97 are driven from a motor 103 through suitable gear reduction at 104 and by a sprocket chain 105 that passes around sprocket wheels 106 on the ends of these conveyor shafts. A clutch 107 is provided for each shaft to throw its conveyor into and out of operation.

The dried material which enters the hoppers 93 is periodically discharged past valves 108 into a hopper or hoppers 109 that in turn are provided with valves 110. With the valves 110 closed, the valves 108 will be opened to permit movement of the materials from hoppers 93 to 109. The valves 108 will be closed when material is being discharged past the valves 110. This arrangement of valves 108–110 permits of maintaining vacuum or suction force as above explained in the drums 91 and 92. The valves 108–110 can be manually operated as required or can be mechanically and periodically operated as are the valves 60 (Fig. 4) at the discharge boxes of the evaporator.

The exhaust heating vapor from the evaporator drums 14–15 (Fig. 1a) is drawn by a suction pump 111 (Fig. 5) through the lines 71–72–73–73a (Fig. 1a) and through pipes 112, 113, 114, 115 (Figs. 1b and 6) and through the jacketed heating spaces 116 that extend around the drums 91 and 92 and into a vacuum chamber 118 that has connection through a line 119 with the suction pump 111. A valve cross connection is provided at 121 to afford communication between the jacketed spaces 116 to, in some cases, insure equalization of temperature in these two spaces.

The drums 91–92 may be tilted somewhat so that condensate in the spaces 116 will drain toward the lower ends of the spaces where it will be drawn off through pipes 122.

Additional heating steam or vapor can be supplied to the jacketed spaces 116, through a line 123, and pipes 124, to supplement or be used in lieu of the vapors drawn from the evaporator unit.

In order to conserve heat and particularly to conserve the exhaust vapor from the evaporator boxes 23, the various drums 14—15 and the vapor conductor pipes 71–72–73–73a–112, as well as the jackets for the drier drums 91–92, will be heat insulated. Also, all parts having engagement with the materials will be of corrosive-resistant metal.

Pipes 125 and 126 (Figs. 2, 3 and 4) are provided for draining the boxes 18 and the tubes 16—17, as when the apparatus is to be closed down for cold weather or repairs.

I claim as my invention:

1. Apparatus for treating mixtures of liquids and solids, comprising a tube mounted with one end at a higher plane than its other end, means for introducing the mixture into the lower end of the tube, means for heating the tube to a vaporizing temperature, and means for continuously advancing the solid portion of the mixture through and out of the upper end of the tube at such rate that no liquid is discharged therewith, the said means comprising a conveyor screw that closely fits within the tube but having a serrated edge that serves as a scraper and strainer.

2. Apparatus for treating mixtures of liquids and solids, comprising an inclined drum of much greater length than diameter, a plurality of laterally-spaced tubes within the drum and extending longitudinally thereof, conveyor screws in the tubes, means on the screws, for straining the solids from the liquid, shafts for driving the screws and advancing the solids through the tubes from the lower ends thereof, a header box for continuously supplying the mixture to the lower ends of the tubes, and means for directing a fluid heating medium into the drum and in completely enveloping relation to each tube.

3. Apparatus for treating mixtures of liquids and solids, comprising an inclined drum of much greater length than diameter, a plurality of laterally-spaced tubes within the drum and extending longitudinally thereof, conveyor screws in the tubes, shafts for driving the screws and advancing the mixture through the tubes from the lower ends thereof, a header box for continuously supplying the mixture to the lower ends of the tubes, means for directing a fluid heating medium into the drum and in completely enveloping relation to each tube, means for withdrawing vapor from the upper ends of the tubes, under subatmospheric pressure, a box for receiving material discharged from the upper ends of the tubes, means for normally maintaining the box sealed against communication with the atmosphere, and means for periodically removing accumulation of material from the discharge box.

4. Apparatus for treating mixtures of liquids and solids, comprising a drum extending in a generally horizontal direction, a plurality of tubes extending longitudinally through the drum and vertically and laterally spaced from one another, a header box chamber communicating with the upper tubes in the drum, a header box chamber communicating with the lower tubes, at one end of the apparatus, means for supplying a mixture to the boxes, conveyor screws for advancing the mixture through the tubes, a common receptacle into which the solid material is discharged, and means for directing a fluid heating medium into the drum and in completely enveloping relation to the tubes.

5. Apparatus for treating mixtures of liquids and solids, comprising a battery of drums, a plurality of inclined tubes disposed within each drum, a pump for supplying the mixtures, supply pipes for directing a heating fluid into the drums, a framework for supporting the drums in unitary relation, conveyor screws and shafts therefor within the tubes, for advancing material therethrough, a header box for the tubes of each drum, at the lower end thereof, for delivering the mixture to the tubes, and a removable cover for the outer side of the box, the conveyor screws and their shafts being removable from their respective drums, through their boxes when the covers are removed.

6. Apparatus for treating mixtures of liquids and solids, comprising a battery of drums, a framework for supporting the drums in unitary relation, a plurality of tubes in each of the drums and extending longitudinally beyond the ends of the drums, pipes for supplying a heating medium to the drums, a pump for supplying a mixture into the tubes at one end of the apparatus, conveyor screws in the tubes, a discharge box for the tubes of each drum, a conveyor conduit for the treated material, a conveyor in the conduit, means for maintaining the boxes and their associated tubes under subatmospheric pressure, valves for controlling communication between the boxes individually and the conveyor conduit, and means operating in timed relation to the said conveyor, for opening and closing the valves.

7. Apparatus for treating mixtures of liquids and solids, comprising a battery of drums arranged in vertically and horizontally spaced relation, a framework for supporting the drums in unitary relation, tubes in the drums and extending longitudinally thereof, means for supplying a mixture into the tubes, at one end of the apparatus, discharge boxes for receiving treated material from the tubes, at the other end of the apparatus, conveyor screws in the tubes, means for supplying a fluid heating medium into the drums, a conveyor tube and screw extending transversely beneath each horizontal row of discharge boxes, a stack for receiving material from the last-named conveyor tubes, a conduit at the lower end of the stack, for receiving the treated material, a conveyor in the conduit, means for maintaining the discharge boxes under subatmospheric pressure, valves separately controlling discharge from the discharge boxes to the second-named conveyor tubes, and means operating in timed relationship to the second-named conveyor screws, for opening and closing said valves individually and selectively.

8. Apparatus for treating mixtures of liquids and solids, comprising a battery of drums that are relatively spaced in vertical and horizontal directions, a framework for supporting the drums, a plurality of tubes disposed within each of the drums and extending longitudinally thereof, screw conveyors in the tubes, means for supplying a mixture to the tubes at one end of the apparatus, discharge receptacles for the solids at the other end of the apparatus, pipes for supplying a heating fluid to the drums, motors carried by the framework at one end of the apparatus, having shafts for driving the conveyor shafts, removable bearings for the conveyor shafts at the other end of the apparatus, a header box at said other end of the apparatus communicating with the tubes of each drum, a removable cover plate for the outer side of each header box, and a detachable connection between each conveyor shaft and its associated motor shaft, located within the discharge receptacles, the conveyor shafts and their screws being removable from the conduits upon removal of the cover plates and the bearings.

J. W. MAGLAUGHLIN.

REFERENCES CITED

The following references are of record in the file of this patent:

UNITED STATES PATENTS

| Number | Name | Date |
|---|---|---|
| 662,173 | McGrath | Nov. 20, 1900 |
| 794,831 | Abraham | July 18, 1905 |
| 1,100,028 | Ravautte | June 16, 1914 |
| 2,004,497 | Badja | June 11, 1935 |
| 2,024,516 | Elcoro | Dec. 17, 1935 |
| 2,066,358 | Musso | Jan. 5, 1937 |
| 2,067,506 | Silva | Jan. 12, 1937 |
| 2,240,503 | Kettenbach | May 6, 1941 |